(12) United States Patent
Craig et al.

(10) Patent No.: US 8,554,955 B2
(45) Date of Patent: Oct. 8, 2013

(54) SYSTEMS AND METHODS FOR AVOIDING HOST LEVEL BUSY AND RETRY LATENCIES

(75) Inventors: Matthew R. Craig, Sahuarita, AZ (US); Clint A. Hardy, Tucson, AZ (US); Roger G. Hathorn, Tucson, AZ (US); Bret W. Holley, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 12/972,313

(22) Filed: Dec. 17, 2010

(65) Prior Publication Data
US 2012/0159003 A1 Jun. 21, 2012

(51) Int. Cl.
G06F 3/00 (2006.01)
G06F 5/00 (2006.01)

(52) U.S. Cl.
USPC .................................. 710/7; 710/17; 710/36

(58) Field of Classification Search
None
See application file for complete search history.

(56) References Cited

U.S. PATENT DOCUMENTS

| 5,539,918 | A | 7/1996 | Allen et al. |
| 6,148,003 | A * | 11/2000 | Van Dort ...................... 370/462 |
| 7,500,023 | B2 | 3/2009 | Casper et al. |
| 2008/0077655 | A1 * | 3/2008 | Ganapathy et al. ........... 709/203 |

* cited by examiner

*Primary Examiner* — Idriss N Alrobaye
*Assistant Examiner* — Zachary K Huson
(74) *Attorney, Agent, or Firm* — Zilka-Kotab, PC

(57) ABSTRACT

In one embodiment, a system includes logic adapted for receiving a command from a first system, logic adapted for determining which resources are required to process the command, logic adapted for checking for the required resources before receiving data associated with the command, logic adapted for receiving the data from the first system, logic adapted for checking for the required resources after receiving the data when the checking for the required resources before receiving data indicated that the required resources were not available before receiving the data, logic adapted for sending a status to the first system if the required resources are not available after receiving the data, and logic adapted for processing the command if the required resources are available either before receiving the data or after receiving the data. In more embodiments, a method and computer program product for processing a command are also presented.

20 Claims, 3 Drawing Sheets

SYSTEMS AND METHODS FOR AVOIDING HOST LEVEL BUSY AND RETRY LATENCIES

BACKGROUND

The present invention relates to data storage systems, and more particularly, this invention relates to methods and systems for avoiding latency associated with communications between a host system and a storage system.

In systems in which a host system communicates with one or more storage systems over Fibre Channel (FC) networks, Fibre Channel Protocol (FCP) operations may be used as a transport protocol between the systems. In addition, some systems may use a higher level protocol referred to herein as Fibre Channel extensions (FCX) which may include IBM zSeries High Performance Fibre Connectivity (FICON), also referred to as zHPF, e.g., ANSI FC-SB-3 Single-Byte Command Code Sets-3 Mapping Protocol for FC protocol; National Committee for Information Technology Standards (NCITS) T11/FC-SB-4 Transport Mode operation, etc. For FCX and/or FCP operations that do not require a XFER_READY message or the like to obtain a first bit of data from the host system, it is possible for a control unit to detect a busy or check condition. Before sending this status to the channel, the control unit must wait until it receives the data from the channel, which will transfer a sequence initiative to the control unit. After sending the busy or check condition status, the control unit is then required to perform several more operations: 1) send a subsequent status to the channel (on a new different connection/exchange) indicating it is now capable of handling new write operations, 2) complete that operation, and 3) wait for the channel to redrive the command. This can be quite long, e.g., several milliseconds.

BRIEF SUMMARY

In one embodiment, a system includes logic adapted for receiving a command from a first system, logic adapted for determining which resources are required to process the command, logic adapted for checking for the required resources before receiving data associated with the command, logic adapted for receiving the data from the first system, logic adapted for checking for the required resources after receiving the data when the checking for the required resources before receiving data indicated that the required resources were not available before receiving the data, logic adapted for sending a status to the first system if the required resources are not available after receiving the data, and logic adapted for processing the command if the required resources are available either before receiving the data or after receiving the data.

In another embodiment, a method includes receiving a command from a first system, determining which resources are required to process the command, checking for the required resources before receiving data associated with the command, receiving the data from the first system, checking for the required resources after receiving the data when the checking for the required resources before receiving data indicated that the required resources were not available before receiving the data, sending a status to the first system if the required resources are not available after receiving the data, and processing the command if the required resources are available either before receiving the data or after receiving the data.

In another embodiment, a computer program product for processing a command includes a computer readable storage medium having computer readable program code embodied therewith. The computer readable program code includes computer readable program code configured to receive a command from a first system, computer readable program code configured to determine which resources are required to process the command, computer readable program code configured to check for the required resources before receiving data associated with the command, computer readable program code configured to receive the data from the first system, computer readable program code configured to check for the required resources after receiving the data when the checking for the required resources before receiving data indicated that the required resources were not available before receiving the data, computer readable program code configured to send a status to the first system if the required resources are not available after receiving the data, and computer readable program code configured to process the command if the required resources are available either before receiving the data or after receiving the data.

Other aspects and embodiments of the present invention will become apparent from the following detailed description, which, when taken in conjunction with the drawings, illustrates by way of example the principles of the invention.

DETAILED DESCRIPTION

Figure 1:
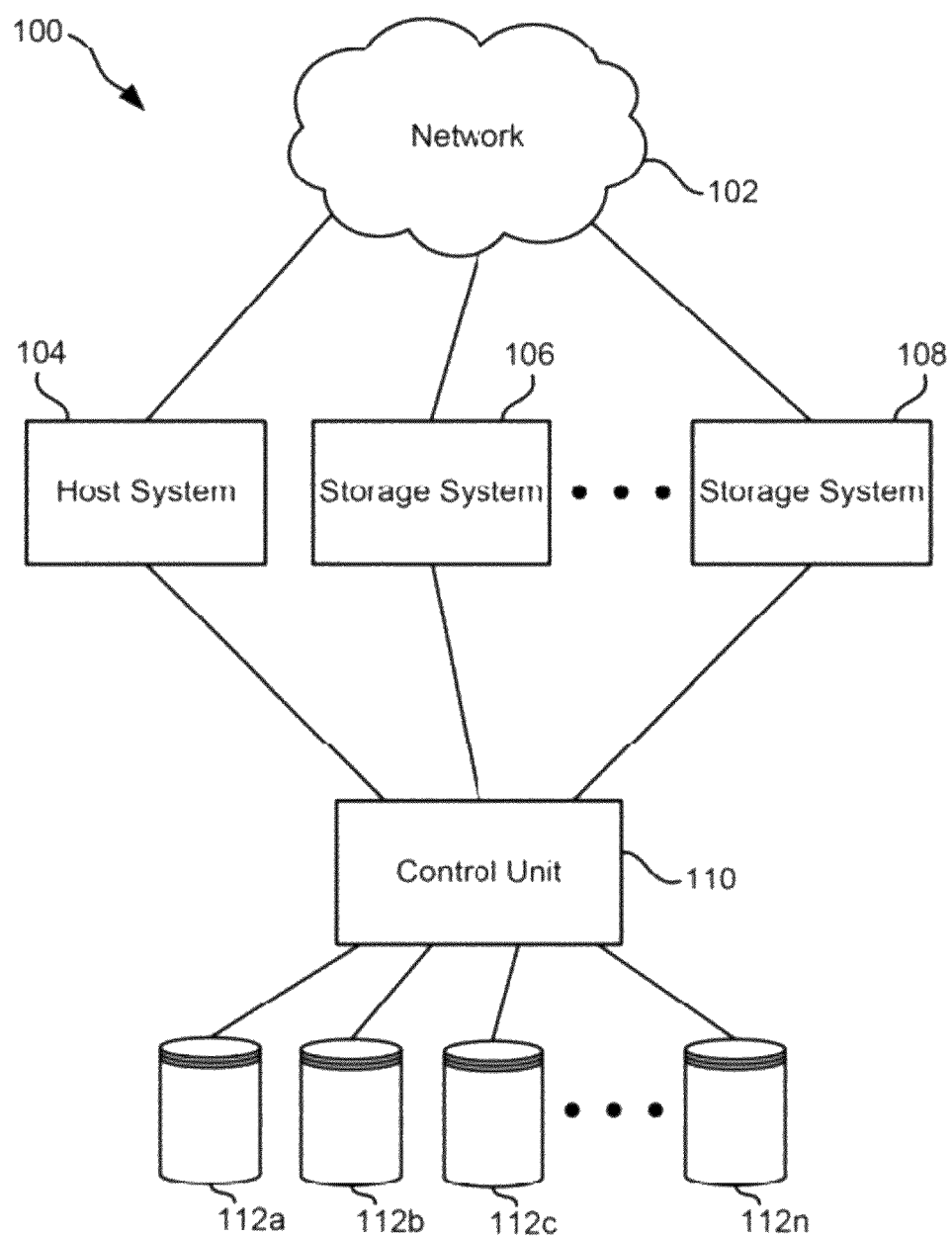
FIG. 1 illustrates a system architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description describes methods and systems for avoiding host level busy and retry latencies. Generally, in the communication between a host system and a storage system, there are times when a command is sent from the host system to the storage system, followed by unsolicited data. If the storage system is unable to process the command, then the command and the unsolicited data have to be re-sent all over again at a later time when the storage system is able to process the command. This type of operation wastes communication capacity and processing capacity of both the host system and the storage system.

In order to avoid these problems, according to one embodiment, a control unit may include logic for hanging on to a status until data has been received from a host system upon receiving a data transfer command, thereby transferring a sequence initiative to the control unit. Rather than sending a 'busy' or 'check condition' status at this point, the control unit performs another check to determine if resources are available to process the command. If so, then the previous status is discarded and the new command is processed. Since there is a fair amount of time between the reception of the command and the associated data, the chances of the control unit resources being available at this time have been greatly improved.

In one general embodiment, a system includes logic adapted for receiving a command from a first system, logic adapted for determining which resources are required to process the command, logic adapted for checking for the required resources before receiving data associated with the command, logic adapted for receiving the data from the first system, logic adapted for checking for the required resources after receiving the data when the checking for the required resources before receiving data indicated that the required resources were not available before receiving the data, logic adapted for sending a status to the first system if the required resources are not available after receiving the data, and logic adapted for processing the command if the required resources are available either before receiving the data or after receiving the data.

In another general embodiment, a method includes receiving a command from a first system, determining which resources are required to process the command, checking for the required resources before receiving data associated with the command, receiving the data from the first system, checking for the required resources after receiving the data when the checking for the required resources before receiving data indicated that the required resources were not available before receiving the data, sending a status to the first system if the required resources are not available after receiving the data, and processing the command if the required resources are available either before receiving the data or after receiving the data.

In another general embodiment, a computer program product for processing a command includes a computer readable storage medium having computer readable program code embodied therewith. The computer readable program code includes computer readable program code configured to receive a command from a first system, computer readable program code configured to determine which resources are required to process the command, computer readable program code configured to check for the required resources before receiving data associated with the command, computer readable program code configured to receive the data from the first system, computer readable program code configured to check for the required resources after receiving the data when the checking for the required resources before receiving data indicated that the required resources were not available before receiving the data, computer readable program code configured to send a status to the first system if the required resources are not available after receiving the data, and computer readable program code configured to process the command if the required resources are available either before receiving the data or after receiving the data.

For the sake of brevity, the descriptions provided herein refer to fibre channel communications, but the embodiments and approaches described herein may be applicable to any communication protocol as long as the host system is allowed to send data before it is requested by the storage system (unsolicited data).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a system architecture 100, in accordance with one embodiment. As shown in FIG. 1, one or more networks 102 are provided for communicating with a plurality of systems, devices, etc. A gateway may be coupled between the networks 102 and any systems, devices, etc. In the context of the present network architecture 100, the network 102 may take any form including, but not limited to a local area network (LAN), a wide area network (WAN) such as the Internet, a public switched telephone network (PSTN), an internal telephone network, a storage area network (SAN), etc. The gateway may function as a router, which is capable of directing a given packet of data that arrives at the gateway, and a switch, which furnishes the actual path in and out of the gateway for a given packet.

According to some embodiments, the connections between the systems 104, 106, 108 may use Fibre Channel protocol or any other protocol that allows for a source system to send data before it is requested by a receiving system.

Further included is at least a host system 104 and a storage system 108. In some embodiments, one or more additional storage systems 106 may be included, along with any number of additional systems, as would be apparent to one of skill in the relevant art. Each system 104, 106, 108 may be connected to the network 102 and/or to each other. It should be noted that each system 104, 106, 108 may be a data server, which may include any type of computing device/groupware, a host system, or any other computing system.

A control unit 110 may be coupled to each of the one or more storage devices 112a, 112b, 112c, . . . , 112n, but is not necessary. Each storage device 112a, 112b, 112c, . . . , 112n, may have a separate control unit, or may include control unit functionality, thereby rendering the control unit 110 unnecessary. In any case, a control unit 110, multiple control units, or no control may be used to communicate and/or control the storage devices 112a, 112b, 112c, . . . , 112n, based on commands issued by one or more of the systems 104, 106, 108, according to various embodiments.

Any number of storage devices may be used, and any type of storage device may be used, such as a direct access storage device (DASD), tape drive, hard disk drive, optical disk drive, non-volatile storage, etc., arranged in any configuration as would be apparent to one of skill in the art. It should be noted that the one or more storage devices 112a, 112b, 112c, . . . , 112n may be shared by two or more of the systems 104, 106, 108, according to one embodiment.

A peripheral or series of peripherals, e.g., facsimile machines, printers, networked and/or local storage units or systems, etc., may be coupled to the network 102, according to various embodiments. It should be noted that databases and/or additional components may be utilized with, or integrated into, any type of network element coupled to the network 102. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 102 may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
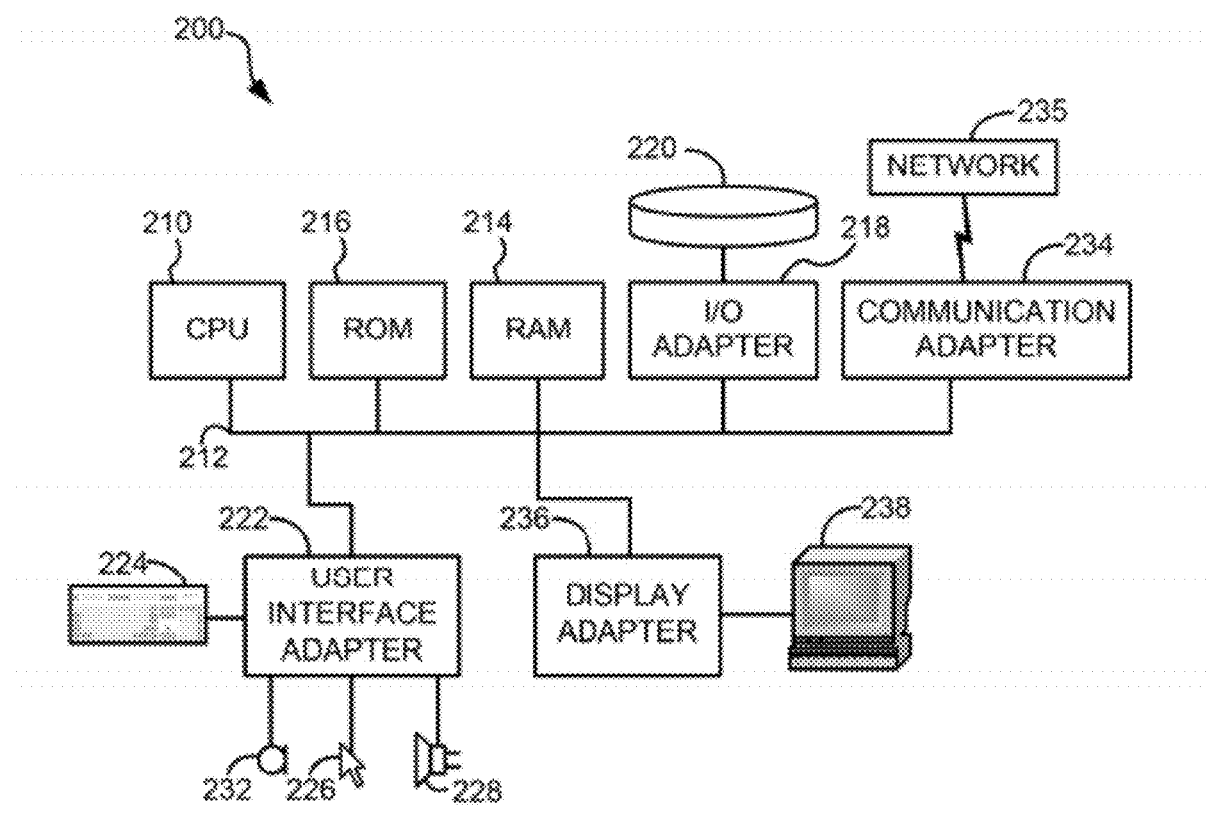
FIG. 2 shows a representative hardware environment that may be associated with the systems of FIG. 1, in accordance with one embodiment.

FIG. 2 shows a representative hardware environment associated with a system 104, 106, 108 or any user device of FIG. 1, in accordance with one embodiment. This figure illustrates a typical hardware configuration of a system 200 having a central processing unit 210, such as a microprocessor, and a number of other units interconnected via a system bus 212. Of course, a system may include more or less units than those shown in FIG. 2, according to various embodiments, and the units shown in FIG. 2 are illustrative only, and not meant to be limiting on any embodiments and/or approaches described herein.

The system 200 shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The system 200 may have resident thereon an operating system such as the Microsoft Windows® Operating System (OS), a MAC OS, a UNIX OS, IBM zOS operating system on IBM zSeries servers, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

It will further be appreciated that embodiments presented herein may be provided in the form of a service deployed on behalf of a customer to offer service on demand.

For simplicity and the place the various embodiments in a context, much of the present description will refer to FCP and FCX protocols.

Thus, any protocol may be used to send commands to and/or from the systems involved. FCP and FCX are exemplary protocols. However, any protocol may be used where a system may send unsolicited data to another system. In one example, an initiating system may send a control to a target system, and there is a mode of operation where the initiator may also send data, shortly after that command, e.g., unsolicited data. After receiving the operation and the data, the target decides whether it can accept the operation, and if the target system can, it executes the command, processes the data, sends data, etc., and the command completes successfully. In transport mode (FCX), e.g., FICON transport mode, the same rationale applies. For example, the channel may send the command followed by the data, and there are situations in the control unit where resources are not available to execute the command presently, e.g., no available task control blocks, exchanges, limited number of exchanges on a given port at a given time, etc. These situations present themselves because there is contention for resources with all of the different channels that can be connected to a single port. So, when the command is received at the target system, a check is performed to determine if the command can be processed, if the resources to process the command are available, and if so, command execution begins, the target system waits for the data, and then processes the data, and finishes the command.

If the resources are not available, according to the prior art, a busy signal is sent to the initiator, and then when the resources are available, then an asynchronous status notification is sent to the initiator indicating that the resources are available and the command should be resent. This process takes time, especially to send all of the requests and status indications, e.g., the control unit busy indication, the deflective resource availability, a control unit end indication, etc.

According to one embodiment, in order to alleviate some of the time used by the status updates and resending of the command, the command may be held until after the data is received for the command, and another check is performed to determine if the resources are available to process the command (and if the resources are available upon receiving the command, it is processed immediately). Therefore, if the resources needed for the command become available after receiving the command and before the data is completely received, then the command may be processed.

Shown in Table 1 below is exemplary link activity for an FCX operation if a CU Busy status is sent to the initiating system and it is required to redrive the command after receiving a CU End status from the control unit, according to the prior art. Table 1 shows two columns, one for the initializing channel or initiating system which causes the FCX operation to proceed. A control unit receives the commands from the channel or initiating system, and responds accordingly. The arrows indicate transmissions between the systems, and the direction of those transmissions. The three dots indicate a waiting period.

TABLE 1

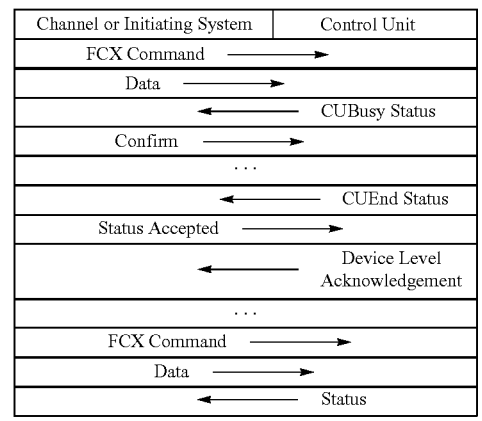

Shown in Table 2 below is exemplary link activity for an FCX operation if the control unit checks for and initially does not find the resources required for executing the FCX operation, and later finds the resources after receiving the data from the host, according to one embodiment.

TABLE 2

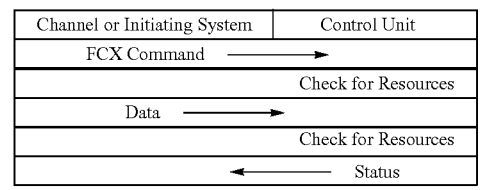

As can be seen from a comparison of Table 1 and Table 2, the operation according to Table 2 requires less steps, less waiting, and speeds up the execution of a command from an initiating system, in some approaches.

Figure 3:
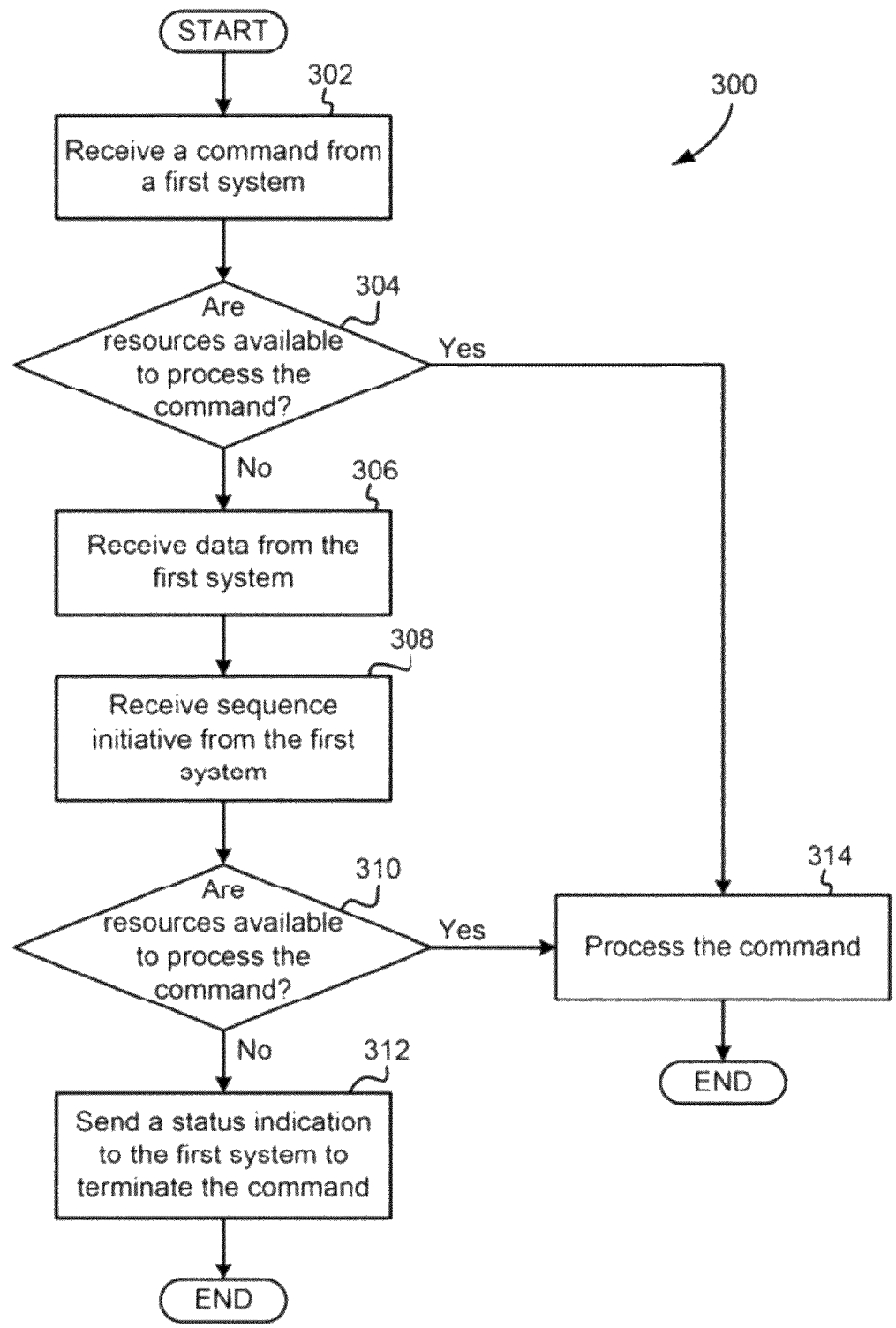
FIG. 3 is a flow diagram of a method for processing a command request, according to one embodiment.

Now referring to FIG. 3, a method 300 is shown for processing a command request, according to one embodiment. Of course, the method 300 may include more or fewer operations than those described below and shown in FIG. 3, as would be apparent to one of skill in the art upon reading the present descriptions.

In operation 302, a command is received from a first system.

In operation 304, which resources are required to process the command are determined, and the required resources are checked for. This operation is performed before receiving data from the first system. If the resources are found, the method 300 continues to operation 314. Otherwise, the method 300 continues to operation 306.

In operation 306, the data is received from the first system which may be used to carry out the command, according to one approach.

In operation 308, a sequence initiative is received from the first system, thereby allowing control of any operations.

In operation 310, the required resources are once again checked for. This operation is performed after receiving the data from the first system.

In operation 312, a status is sent to the first system indicating that the resources are not available if the required resources are not available.

In operation 314, the command is processed if the required resources are available. This operation may be carried out after either resource check in operations 304 and/or 310.

According to some embodiments, the method 300 may include storing the received data to a DASD, such as a magnetic disk drive, optical disk drive, Flash memory device, etc. The DASD may be a part of a system which performs the method 300, according to one approach.

In another approach, the command may adhere to a Fibre Channel protocol, such as FCP and/or FCX, as previously described.

In one embodiment, processing of the command may begin before receiving the data if the required resources are available before receiving the data. If the processing is very quick, the command may be processed before the data arrives, during reception of the data, or the command may complete after reception of the data, according to various approaches.

In further approaches, a sequence initiative may be sent to the first system after processing the command, thereby allowing the first system to control operations moving forward.

In more embodiments, the status sent to the first system if the required resources are not available after receiving the data indicates that the second system is busy and cannot process the command, e.g., it may be a "CU Busy" status.

In another embodiment, the method 300 may include checking for the required resources after sending the status to the first system and sending a second status to the first system after the required resources are available indicating that the required resources are available. This allows the first system to resend the command and data quickly after receiving the second status, instead of randomly resending the command without any information about whether the required resources are available.

The method 300 may be implemented in a system and/or computer program product, according to even more embodiments.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
   logic adapted for receiving a command from a first system;
   logic adapted for determining which resources are required to process the command;
   logic adapted for checking for the required resources before receiving data associated with the command;
   logic adapted for receiving the data from the first system;
   logic adapted for checking for the required resources after receiving the data when the checking for the required resources before receiving data indicated that the required resources were not available before receiving the data;
   logic adapted for sending a status to the first system if the required resources are not available after receiving the data; and
   logic adapted for processing the command if the required resources are available either before receiving the data or after receiving the data.

2. The system as recited in claim 1, further comprising logic adapted for receiving a sequence initiative from the first system after receiving the data associated with the command.

3. The system as recited in claim 1, wherein at least one of the first system and the second system comprise a direct access storage device.

4. The system as recited in claim 1, wherein the command adheres to a fibre channel protocol which provides for unsolicited data to be sent shortly after the command.

5. The system as recited in claim 1, wherein the logic adapted for processing the command at least begins to process the command before receiving the data if the required resources are available before receiving the data.

6. A method, comprising:
   receiving a command from a first system;
   determining which resources are required to process the command;
   checking for the required resources before receiving unsolicited data associated with the command;
   receiving the unsolicited data from the first system;
   checking for the required resources after receiving the unsolicited data when the checking for the required resources before receiving the unsolicited data indicated that the required resources were not available before receiving the unsolicited data;
   sending a status to the first system if the required resources are not available after receiving the unsolicited data; and
   processing the command if the required resources are available either before receiving the unsolicited data or after receiving the unsolicited data.

7. The method as recited in claim 6, further comprising receiving a sequence initiative from the first system after receiving the unsolicited data associated with the command.

8. The method as recited in claim 6, further comprising storing the received unsolicited data to a direct access storage device.

9. The method as recited in claim 6, wherein the command adheres to a fibre channel protocol.

10. The method as recited in claim 6, wherein processing the command at least begins processing the command before receiving the unsolicited data if the required resources are available before receiving the unsolicited data.

11. A computer program product for processing a command, the computer program product comprising:
   a non-transitory computer readable storage medium having computer readable program code embodied therewith, the computer readable program code comprising:
   computer readable program code configured to receive a command from a first system;
   computer readable program code configured to determine which resources are required to process the command after receipt thereof;
   computer readable program code configured to check for the required resources before receiving data associated with the command;

computer readable program code configured to receive the data from the first system;

computer readable program code configured to check for the required resources after receiving the data when the checking for the required resources before receiving data indicated that the required resources were not available before receiving the data;

computer readable program code configured to send a status to the first system if the required resources are not available after receiving the data;

computer readable program code configured to at least begin to process the command if the required resources are available before receiving the data; and computer readable program code configured to fully process the command when the required resources are available.

12. The computer program product as recited in claim 11, further comprising computer readable program code configured to receive a sequence initiative from the first system after receiving the data associated with the command.

13. The computer program product as recited in claim 11, further comprising computer readable program code configured to store the received data to a direct access storage device.

14. The computer program product as recited in claim 11, wherein the command from the first system adheres to a fibre channel protocol.

15. The computer program product as recited in claim 11, wherein the status sent to the first system if the required resources are not available after receiving the data indicates that a second system is busy and cannot process the command.

16. A system, comprising:
   logic adapted for receiving a command from a first system, the command adhering to a fibre channel protocol which provides for unsolicited data to be sent shortly after the command;
   logic adapted for determining which resources are required to process the command;
   logic adapted for checking for the required resources before receiving data associated with the command;
   logic adapted for receiving the data from the first system;
   logic adapted for receiving a sequence initiative from the first system;
   logic adapted for checking for the required resources after receiving the data when the checking for the required resources before receiving data indicated that the required resources were not available before receiving the data;
   logic adapted for sending a status to the first system if the required resources are not available after receiving the data; and
   logic adapted for processing the command if the required resources are available either before receiving the data or after receiving the data,
   wherein at least one of the first system and the second system comprise a direct access storage device.

17. The system as recited in claim 16, wherein the logic adapted for processing the command at least begins to process the command before receiving the data if the required resources are available before receiving the data.

18. The system as recited in claim 16, further comprising logic adapted for sending a sequence initiative to the first system after processing the command.

19. The system as recited in claim 16, wherein the status sent to the first system if the required resources are not available after receiving the data indicates that the second system is busy and cannot process the command.

20. The system as recited in claim 16, further comprising logic adapted for checking for the required resources after sending the status to the first system and sending a second status to the first system after the required resources are available indicating that the required resources are available.

* * * * *